(12) United States Patent
Charoensirisomboon et al.

(10) Patent No.: US 8,129,455 B2
(45) Date of Patent: Mar. 6, 2012

(54) FLAME RETARDANT THERMOPLASTIC MOLDING COMPOSITIONS

(75) Inventors: Piyada Charoensirisomboon, Mannheim (DE); Maarten Staal, Durham, NC (US); Michel Pepers, Ludwigshafen (DE); Christoph Link, Worms (DE)

(73) Assignee: Styrolution GmbH (DE)

( * ) Notice: Subject to any disclaimer, the term of this patent is extended or adjusted under 35 U.S.C. 154(b) by 0 days.

(21) Appl. No.: 12/668,304

(22) PCT Filed: Jul. 8, 2008

(86) PCT No.: PCT/EP2008/058820
§ 371 (c)(1),
(2), (4) Date: Jan. 8, 2010

(87) PCT Pub. No.: WO2009/007358
PCT Pub. Date: Jan. 15, 2009

(65) Prior Publication Data
US 2010/0210766 A1    Aug. 19, 2010

(30) Foreign Application Priority Data

Jul. 10, 2007   (EP) .................................... 07112183

(51) Int. Cl.
*C08K 5/00* (2006.01)
*C08K 5/52* (2006.01)

(52) U.S. Cl. ........................................ 524/123; 524/141

(58) Field of Classification Search .................. 524/123
See application file for complete search history.

(56) References Cited

U.S. PATENT DOCUMENTS

| | | | |
|---|---|---|---|
| 3,639,517 A | 2/1972 | Kitchen et al. | |
| 4,038,469 A | 7/1977 | Walker et al. | |
| 4,304,881 A | 12/1981 | Aoki et al. | |
| 5,196,480 A | 3/1993 | Seitz et al. | |
| 6,031,053 A | 2/2000 | Knoll et al. | |
| 6,369,160 B1 | 4/2002 | Knoll et al. | |
| 6,521,712 B1 | 2/2003 | Knoll et al. | |
| 6,579,937 B1 | 6/2003 | Guntherberg et al. | |
| 6,593,430 B1 | 7/2003 | Knoll et al. | |
| 6,812,283 B2 | 11/2004 | Duijzings et al. | |
| 2002/0107323 A1 | 8/2002 | Uzee et al. | |
| 2008/0269414 A1 | 10/2008 | Knoll et al. | |
| 2009/0286918 A1 | 11/2009 | Stewart et al. | |
| 2010/0152387 A1 | 6/2010 | Steininger et al. | |

FOREIGN PATENT DOCUMENTS

| | | |
|---|---|---|
| CA | 1087339 | 10/1980 |
| DE | 1260135 | 2/1968 |
| DE | 2550227 | 5/1977 |
| DE | 2829625 A1 | 1/1980 |
| DE | 19810141 | 9/1999 |
| DE | 102005006137 | 8/2006 |
| EP | 0022200 A1 | 1/1981 |
| EP | 0450485 A2 | 10/1991 |
| EP | 0654488 | 5/1995 |
| EP | 0698639 | 2/1996 |
| EP | 0730000 A1 | 9/1996 |
| EP | 0766706 B1 | 12/2001 |
| EP | 1260135 A1 | 11/2002 |
| EP | 1619345 A2 | 1/2006 |
| GB | 1124911 | 8/1968 |
| JP | 6025476 A | 2/1994 |
| JP | 2007031611 A | 2/2007 |
| WO | WO-00/36010 A1 | 6/2000 |
| WO | WO-00/58380 | 10/2000 |
| WO | WO-02/10222 A1 | 2/2002 |
| WO | WO-03/046071 A1 | 6/2003 |
| WO | WO-2005/103136 A2 | 11/2005 |
| WO | WO-2006/058731 A2 | 6/2006 |
| WO | WO-2006/074819 | 7/2006 |
| WO | WO 2008/104481 | 9/2008 |
| WO | WO-2009/007358 | 1/2009 |
| WO | WO-2009/037236 | 3/2009 |
| WO | WO-2009/062923 | 5/2009 |
| WO | WO-2009/074645 | 6/2009 |
| WO | WO-2009/121821 | 10/2009 |

OTHER PUBLICATIONS

Jyung, XP-002497056 (KR 203633), Oct. 2004.*
U.S. Appl. No. 12/278,400, filed Jan. 21, 2009, Urban et al.
U.S. Appl. No. 12/677,960, filed Mar. 12, 2010, Knoll et al.
Beckerle K et al: "Stereospecific post-metallacene polymerization catalysts: the example of isospecific styrene polymerization" Journal of Organometallic Chemistry, Elsevier-Sequoia S.A. Lausanne, CH, Bd. 689, Nr. 24, Nov. 29, 2004.
Cazzaniga, L.: "Synthesis and Characterization of Isotactic Polystyrene/Polybutadiene Block Coploymers" Macromolecules, Bd. 24, 1991, Seiten 5817-5822.
Gall Barbara T et al: "Molecular Weight and end group control of isotactic polystyrene using olefins and nonconjugated diolefins as chain transfer agents" Macromolecules, Bd. 41, Nr. 5, Feb. 7, 2008.
Ascenso, et al., "Isospecific Oligo-/Polymerization of Styrene with Soluble Cationic Nickel Complexes. The Influence of Phosphorus(III) Ligands," Macromolecules, vol. 29, 1996, pp. 4172-4179.
Cazzaniga et al., "Anionic Synthesis of Isotactic Polystyrene," Macromolecules, vol. 22, 1989, pp. 4125-4128.

(Continued)

*Primary Examiner* — Ling Choi
*Assistant Examiner* — Hui Chin
(74) *Attorney, Agent, or Firm* — Connolly Bove Lodge & Hutz LLP

(57) ABSTRACT

A flame retardant thermoplastic molding composition containing a thermoplastic copolymer A, a graft copolymer B, and a flame retardant component C, wherein the molding composition contains:
  A: from 40 to 80% by weight of a thermoplastic copolymer A, obtainable e.g. from acrylonitrile and styrene;
  B: from 15 to 50% by weight of a graft ABS copolymer B, and
  C: from 15 to 30% by weight of the flame retardant component C, comprising at least an expandable graphite component (C1) and a phosphorous flame retardant component (C2) and a perfluorinated polymer (C3);
has a high fire protection and improved mechanical properties.

19 Claims, No Drawings

OTHER PUBLICATIONS

Liu et al., "Synthesis of Isotactic Polystyrene with a Rare-Earth Catalyst," Journal of Polymer Science: Part A: Polymer Chemistry, vol. 36, 1998, pp. 1773-1778.

Makino, et al., "Anionic Synthesis of Highly Isotactic Polystyrene in Hexane in the Presence of Lithium Hydroxides," Macromolecules, vol. 32, 1999, pp. 5712-5714.

Po, et al., "Polymerization of Styrene with Nickel Complex/ Methylaluminoxane Catalytic Systems," Journal of Polymer Science, Part A: Polymer Chemistry, vol. 36, 1998, pp. 2119-2126.

Crossetti, et al., "Polymerization of styrene to isotactic polymer with MAO-Ni(acac)$_2$. Examination of the factors that influence activity and stereospecificity," Macromol. Rapid Commun., vol. 18, 1997, pp. 801-808.

Jyung, et al, "Styrene resin compositions with nonhalogen flame retardant"—Accession No. XP-002497056, 2004, p. 1.

U.S. Appl. No. 12/444,731, filed Apr. 8, 2009.

U.S. Appl. No. 12/668,286, filed Jan. 8, 2010.

* cited by examiner

FLAME RETARDANT THERMOPLASTIC MOLDING COMPOSITIONS

CROSS-REFERENCE TO RELATED APPLICATIONS

This application is a national stage application (under 35 U.S.C. §371) of PCT/EP2008/058820, filed Jul. 8, 2008, which claims benefit of European application 07112183.4, filed Jul. 10, 2007.

BACKGROUND OF THE INVENTION

The invention relates to a flame retardant thermoplastic molding composition based on an acrylonitrile-butadiene-styrene polymer (ABS), a copolymer matrix and a particular flame retardant component, where the flame retardant component comprises a phosphor-containing component (e.g. a triphenylphospin-compound), an expandable graphite component and a fluorinated polymer.

The invention further relates to a process for preparation of a flame retardant thermoplastic ABS molding composition and to its uses. The invention also relates to products such as moldings, foils and coatings, which can be produced from flame retardant thermoplastic molding compositions, and also to the uses of the molding composition. Instead of ABS as a component, a classical ASA-copolymer based on an alkylacrylate and styrene can also be used.

It has been known for decades that various thermoplastic molding compositions can be prepared by modifying styrene-acrylonitrile copolymers via incorporation of rubbers. By way of example, this is achieved via graft copolymerization of styrene and acrylonitrile in the presence of a rubber, and also via subsequent blending of this graft copolymer with a separately prepared polymer matrix which can, for example, be composed of a styrene-acrylonitrile copolymer and/or of a methylstyrene-acrylonitrile copolymer.

In the last years, various flame retardant components have been described. For example, in EP-A 0 730 000 a flame retardant polymer composition is described which can be used for various polymer compositions comprising a heat-expandable graphite and a phosphorous compound. However, most flame retardant compounds are not sufficient effective with polymers such as ABS and ASA. In EP-A 0 730 000 no fluorinated polymer is used in the polymer compositions.

In WO 2005/103 136, a fire retardant polymer composition is described which contains heat-expandable graphite and a phosphorous containing fire retardant. Furthermore, the compositions disclosed contain a co-additive to depress the migration of phosphorous containing retardants on the polymer surface. As this co-additive, a polycarbonate based on bisphenol A is used.

In EP-A 1 619 345, thermoplastic polymer materials are disclosed which contain as a flame retardant compound an ammonium phosphate compound and/or a graphite component.

However, no fluorinated polymers are used as further component in the thermoplastic moldings.

In WO 2006/058731, the combination of various polystyrole polymers with phosphorous compounds is described.

It also has been known for years that certain additives (e.g. zinkborate or expandable graphite) to polymer compositions can improve the flammability of the polymer product. For several polymers like e.g. polyamides or polyolefines, these flame retardant additives are described in the literature. However, for ABS-copolymers, no adequate flame protection is known without using components which contain chlorine and/or bromine.

The flame protection of the ABS-copolymer has a high economical need and should be achieved by mixing the copolymer components with the flame retardant components in a simple to be applied process.

The flame retardant component should help to avoid the polymer to burn even at direct contact with a flame and at higher temperatures. Furthermore, the melting and/or softening of the thermoplastic polymer should be reduced and the burning of polymer, and in particular polymer drops should be avoided. Polymer materials are desired to be flame-retardant to prevent fire accidents or fire spreading in use for e.g. insulating materials such as electric wires and cables; sheath materials; enclosures and internal parts of electric, electronic, and office automation apparatuses; interior materials of vehicles; and building materials.

Many polymer materials for such uses, particularly for electric and electronic devices, are enforced to be fire retardant by legislation. For flame retardancy of polymer materials, known flame-retardant additives include halogen type fire-retardant additives, magnesium hydroxide, aluminum hydroxide, red phosphorus, and phosphorus compounds. These fire-retardant materials, however, are not perfect, and have several disadvantages.

The halogen type fire-retardant additives, which give a high level of fire retardancy (for example the commercial products UL-94V-0, V-1, or V-2) with a small amount of addition, generate soot or smoke in a larger amount on burning. Further, the halogen type fire-retardant additives emit acidic substances such as a hydrogen chloride by heat of processing or at the time of fire accident, which would cause corrosion of the machines for resin processing, or produce adverse effects on human health or apparatuses in the vicinity of a fire site.

Metal hydroxides as flame-retardant, component such as magnesium hydroxide and aluminium hydroxide, are required to be added to the resin in a larger amount. The addition thereof in a larger amount, e.g. from 35 to 50 percent by weight, will impair the mechanical strength, lightweight/density and other characteristics of the thermoplastic polymer.

It also has been known for years that phosphorus type fire-retardant additives, such as red phosphorus and phosphoric acid esters, are effective in a small amount for polyamides, polyesters, polyphenylene oxides and other plastics. However, they have shown to have less effect of flame retardancy for other polymers e.g. for styrene thermoplastics, such as ABS, HIPS and polystyrene.

BRIEF SUMMARY OF THE INVENTION

Therefore, there is a high demand for flame-retardant components which contain no chlorine or bromide, emit less smoke and less corrosive gas, and are effective in ABS-copolymers, even in smaller amounts of addition, e.g. less than 33 percent by weight. Furthermore, there is a need for additives which do not dramatically reduce the mechanical strength of the polymer.

The above mentioned technical problems can be solved by providing a flame retardant thermoplastic molding composition, comprising a thermoplastic copolymer A, a graft copolymer B, and a flame retardant component C and also, if appropriate, further components K, where the molding composition comprises:

A: from 40 to 80% by weight of a thermoplastic copolymer A, obtainable from acrylonitrile and of styrene or α-methylstyrene or of a mixture composed of styrene and α-methylstyrene;
B: from 15 to 50% by weight of a graft copolymer B, which can be prepared from a graft base (B1), obtainable via the reaction of styrene and/or butadiene and/or an acrylate (in particular a $C_2$-$C_{10}$ alkylacrylate, such as butylacrylate), and eventually other copolymerizable components; and a graft shell (B2), obtainable via reaction of the graft base (B1) with a mixture of styrene and/or α-methylstyrene and acrylonitrile;
C: from 15 to 32% by weight of the flame retardant component C, comprising at least three components:
   (C1) an expandable graphite component (C1), and
   (C2) an phosphorous flame retardant component (C2), and
   (C3) a perfluorinated polymer (C3);
P: from 0 to 15% by weight of a styrene-butadien-copolymer P,
K: from 0 to 5% by weight of further components K,
where the entire composed thermoplastic composition gives exactly 100% by weight.

DETAILED DESCRIPTION OF THE INVENTION

In a preferred embodiment of the invention, a flame retardant thermoplastic molding composition is prepared, where the molding composition comprises (or in a preferred embodiment consists of):
A: from 40 to 80% by weight of a thermoplastic copolymer A obtainable from:
(A1): from 18 to 36% by weight, based on the copolymer A, of acrylonitrile, and
(A2): from 64 to 82% by weight, based on the copolymer A, of styrene or α-methylstyrene or of a mixture composed of styrene and α-methylstyrene;
B: from 15 to 50% by weight of a graft copolymer B, which can be prepared from:
(B1) from 50 to 70% by weight, based on the graft copolymer B, of a graft base (B1), obtainable via the reaction of:
   (B11): from 0 to 10% by weight, based on the graft base (B1), of styrene,
   (B12): from 90 to 100% by weight, based on the graft base (B1), of butadiene, and
   (B13): from 0.01 to 5% by weight, based on the graft base (B1), of other components, where the total (B11)+(B12)+(B13) gives exactly 100% by weight; and
(B2): from 30 to 50% by weight, based on the graft copolymer B, of a graft shell obtainable via reaction of the graft base (B1) with a mixture of:
   (B21) from 72 to 82% by weight, based on the graft shell (B2), of styrene, and
   (B22) from 18 to 28% by weight, based on the graft shell (B2), of acrylonitrile,
where the entirety composed of graft base (B1) and graft shell (B2) gives exactly 100% by weight of the graft polymer B;
C: from 15 to 32% by weight of the flame retardant component C, comprising:
(C1) an expandable graphite component (C1), wherein at least 80% by weight of (C1) does not expand at temperatures under 270° C., and
(C2) a phosphorous flame retardant component (C2), and
(C3) a perfluorinated polymer (C3);
P: from 0 to 15% by weight of a styrene-butadien-block-copolymer P,
K: from 0 to 5% by weight of further components K,
where the entire composed thermoplastic molding composition gives exactly 100% by weight.

In a further embodiment of the invention, a flame retardant thermoplastic molding composition is provided, comprising (or in a preferred embodiment consisting of) 40 to 60% by weight of a thermoplastic copolymer A, 15 to 30% by weight of a graft copolymer B, and 15 to 32%, in particular 20 to 32% by weight of a flame retardant component C, where the flame retardant component C comprises:
(C1): from 20 to 80% by weight, based on the flame retardant component C, of an expandable graphite (C1) with an expansion-temperature of higher than 270° C. (preferably 280° C. or higher)
(C2): from 20 to 80% by weight, based on the flame retardant component C, of a phosphorous flame retardant component (C2), and
(C3): from 0.1 to 2% by weight, based on the flame retardant component C, of a perfluorinated polyolefine (C3).

The invention also deals with flame retardant thermoplastic molding compositions, wherein the phosphorous flame retardant component (C2) is one or more compounds selected from tri-arylphosphines, a phosphate, a phosphite or a phosphorus compound containing nitrogen, esters of oxo-acid of phosphorus (hereinafter referred to as "phosphoric acid"), salts of phosphoric acid, salts of phosphoric acid esters, and salts of condensed phosphoric acids. As phosphorous flame retardant component (C2) a triaryl phosphine, a triaryl phosphate (e.g. triphenylphosphate) or ammonium poly phosphate are particularly useful. The phosphorous flame retardant component (C2) can also be triphenyl phosphate or ammonium polyphosphate; also mixtures can be applied.

In a further embodiment of the invention, a flame retardant thermoplastic molding composition is provided, wherein at least 80% by weight of (C1) do expand only at temperatures of 280° C. or higher.

In a further embodiment of the invention, a flame retardant thermoplastic molding composition is provided, wherein the expandable graphite component (C1) has a particle size distribution in which not more than 20% by weight of the particles pass through a 80 mesh sieve.

In another embodiment of the invention, a flame retardant thermoplastic molding composition is prepared, wherein the perfluorinated polyolefine component (C3) is a polytetrafluorethylene polymer (e.g. a Teflon such as PTFE TE-3893).

In a further embodiment of the invention, a flame retardant thermoplastic molding composition is provided, where the flame retardant component C comprises:
   (C1): from 8 to 15% by weight, based on the thermoplastic molding composition, of the expandable graphite (C1);
   (C2): from 4 to 15%, by weight, based on the thermoplastic molding composition, of the phosphorous flame retardant component (C2); and
   (C3): from 0.01 to 0.4% by weight, based on the thermoplastic molding compostion, of a perfluorinated polyolefine (C3).

In a preferred flame retardant thermoplastic molding composition from 50 to 80% by weight consist of a thermoplastic copolymer A, obtainable by emulsion or bulk polymerization from acrylonitrile and styrene.

In a further embodiment of the invention, a flame retardant thermoplastic molding composition is provided, comprising from 15 to 30% by weight of a graft copolymer B, obtainable via emulsion polymerization (e.g. initiated by peroxodisulfate or a redox initiator system) from styrene, butadiene and acrylonitrile.

The invention also relates to a process for the preparation of a flame retardant thermoplastic molding composition, comprising the step of mixing of a thermoplastic copolymer A and of a graft copolymer B with a flame retardant component C and also, if appropriate, further components K, wherein the molding composition comprises:

A: from 40 to 80% by weight of a thermoplastic copolymer A, obtainable from acrylonitrile and of styrene or α-methylstyrene or of a mixture composed of styrene and α-methylstyrene;

B: from 15 to 50% by weight of a graft copolymer B, which can be prepared from a graft base (B1), obtainable via the reaction of styrene, butadiene, and eventually other copolymerizable components; and a graft shell (B2), obtainable via reaction of the graft base (B1) with a mixture of styrene and/or α-methylstyrene and acrylonitrile; or B': from 15 to 50% by weight of a graft copolymer B, which can be prepared from a graft base (B1), obtainable via the reaction of butylacrylate, and eventually other (copolymerizable) components; and a graft shell (B2), obtainable via reaction of the graft base (B1) with a mixture of styrene and/or α-methylstyrene and acrylonitrile;

C: from 15 to 30% by weight of the flame retardant component C, comprising at least three components:
 (C1) an expandable graphite component (C1), and
 (C2) an phosphorous flame retardant component (C2), and
 (C3) a perfluorinated polymer (C3);

P: from 0 to 15% by weight of a styrene-butadien-block-copolymer P,

K: from 0 to 5% by weight of further components K, and wherein the entire composed thermoplastic molding composition gives exactly 100% by weight.

In a preferred embodiment, the composition contains 1 to 15% by weight of a styrene-butadien-block-copolymer P, which can be prepared by anionic polymerization, e.g. the commercial product Styroflex® (of BASF, Germany). These copolymers are described more in detail in EP-A 0 766 706, where elastomeric block-copolymers of from 35 to 85 percent by weight of styrene and from 15 to 65 percent by weight of butadien are disclosed.

A further aspect of the invention is the use of a flame retardant thermoplastic molding composition as described for the preparation of flame retardant moldings.

A molding prepared from a flame retardant thermoplastic molding composition as described is also part of this invention.

Typical ABS-copolymers to be used according to the invention are known for years. For example, EP-A 0 022 200 discloses that thermoplastic ABS-molding compositions can be prepared which comprise a copolymer matrix composed of styrene and acrylonitrile, and also comprise a graft copolymer composed of a rubber latex, styrene, and acrylonitrile. Here, for example, a polybutadiene latex is first prepared via free-radical polymerization using potassium peroxodisulfate as initiator. This rubber latex is then subjected to agglomeration, which serves to enlarge the rubber particles.

Typical ASA-copolymers based on acrylates and styrene-acrylonitril-copolymers to be used are also known for years (see EP-A 0 450 485). For example, DE-A 1 260 135 discloses that thermoplastic ASA-compositions can be prepared which comprise a copolymer matrix composed of e.g. styrene and acrylonitrile, and also comprise a graft copolymer composed of an $C_4$-$C_8$ alkylacrylate, styrene and acrylonitrile.

The copolymer matrix A is preferably prepared from the components acrylonitrile and styrene and/or α-methylstyrene via bulk polymerization or in the presence of one or more solvents. Preference is given here to copolymers A whose molar masses $M_w$ are from 50 000 to 300 000 g/mol, the molar masses being capable of determination by way of example via light scattering in tetrahydrofuran (GPC with UV detection).

The copolymer matrix A can in particular comprise:

(Aa) polystyrene-acrylonitrile, prepared from, based on (Aa), from 64 to 82% by weight of styrene and from 18 to 36% by weight of acrylonitrile, or (Ab) poly-α-methylstyrene-acrylonitrile, prepared from, based on (Ab), from 64 to 82% by weight of α-methylstyrene and from 18 to 36% by weight of acrylonitrile, or (Ac) a mixture of copolymer matrix (Aa) and of copolymer matrix (Ab).

The copolymer matrix A can also be obtained via copolymerization of acrylonitrile, styrene, and α-methylstyrene.

The number-average molar mass ($M_n$) of the copolymer matrix A preferably amounts to from 15 000 to 100 000 g/mol (determined by means of GPC with UV detection).

The viscosity (Vz) of the copolymeric matrix A amounts by way of example to from 50 to 120 ml/g (measured to DIN 53726 at 25° C. in a 0.5% strength by weight solution in DMF). The copolymer matrix A can be prepared via bulk polymerization or solution polymerization in, for example, toluene or ethylbenzene, by a process as described by way of example in Kunststoff-Handbuch (Plastics Handbook, Vieweg-Daumiller, volume V, (Polystyrol) [Polystyrene], Carl-Hanser-Verlag, Munich 1969, pages 122 ff.)

The graft copolymer component B has a complex structure and is in essence composed of from 50 to 70% by weight, based on B, of a graft base (B1) and of from 30 to 50% by weight of a graft shell (B2), the % by weight data always being based on the total weight of component B.

The graft base (B1) can by way of example be obtained via reaction of from 0 to 10% by weight of styrene and from 90 to 100% by weight of butadiene, and also from 0.01 to 5% by weight of ancillary components, the % by weight data being based on the graft base (B1).

The graft shell (B2) can for example be obtained via reaction of from 72 to 82% by weight of styrene and from 18 to 28% by weight of acrylonitrile, and also from 0.01 to 5% by weight of ancillary components (% by weight, based on the graft shell B2), in the presence of the graft base (B1).

The thermoplastic molding composition preferably comprises at least one thermoplastic graft polymer B with from 20 to 80% by weight rubber content. The molding composition can also comprise two or more different graft polymers.

For preparation of the graft polymer B it is preferable to use a radical initiator, e.g. a redox initiator system, in particular comprising an organic peroxide, and also at least one reducing agent. The organic peroxide used preferably comprises a compound selected from the group of di-tert-butyl peroxide, cumene hydroperoxide, tert-butyl hydroperoxide, and p-menthane hydroperoxide, and mixtures thereof. The reducing agent used generally comprises at least one water-soluble compound with reducing action.

It is preferable that an emulsion polymerization is carried out for preparation of the graft base (B1) and uses potassium peroxodisulfate as initiator.

As mentioned above, the copolymer A is preferably composed of the monomers styrene and acrylonitrile, of the monomers α-methylstyrene and acrylonitrile, or of the monomers styrene, α-methylstyrene, and acrylonitrile. However, in principle it is also possible to use polymer matrices which comprise further monomer units.

Examples of suitable preparation processes for the graft copolymers B are emulsion polymerization, solution polymerization, suspension polymerization, or bulk polymerization, and the graft copolymers B here are preferably prepared via aqueous free-radical emulsion polymerization. WO-A 2002/10222, DE-A 28 26 925, and also in EP-A 022 200 inter alia describe suitable polymerization processes.

By way of example, the graft base (B1) can be prepared via free-radical-initiated aqueous emulsion polymerization, by using a portion of the monomers in an aqueous reaction medium as initial charge and adding the remaining residual amount of monomers, if appropriate, in the aqueous reaction medium after initiation of the free-radical polymerization reaction. It is also possible to use at least a portion of the free-radical polymerization initiator and, if appropriate, of further auxiliaries in the aqueous reaction medium as initial charge, to bring the resultant aqueous reaction medium to polymerization temperature, and at this temperature to add the monomers to the aqueous reaction medium. This introduction can also take the form of a mixture, for example the form of an aqueous monomer emulsion.

The reaction is initiated via water-soluble or oil-soluble free-radical polymerization initiators, e.g. inorganic or organic peroxides (for example peroxodisulfate or benzoyl peroxide), or with the aid of redox initiator systems. It is preferable that peroxodisulfate is used as initiator in preparation of the graft base (B1). The amount of free-radical initiator used, based on the entire amount of monomer, is generally from 0.01 to 5% by weight, preferably from 0.1 to 3% by weight, and particularly preferably from 0.2 to 1.5% by weight.

As described above, the flame retardant component C of the thermoplastic composition according to the invention comprises at least three types of compounds. These compounds are per se known substances, but they were not used as a combination.

Component C1 of the thermoplastic composition of the present invention is heat-expandable graphite. The heat-expandable graphite is derived from natural graphite or artificial graphite. In a particular embodiment of the invention, the heat-expandable graphite expands on rapid heating from room temperature to 800° C. in the c-axis direction of the crystal with the specific volume change of normally 100 ml/g or more by the temperature change. This high expandability is preferred because heat-expandable graphites exhibiting the specific volume difference of at least 100 ml/g by the rapid heating give more fire retardancy than the one of less than 100 ml/g.

An important characteristic of the heat-expandable graphite of the present invention is that it preferably does not expand on heating before achieving a temperature of 270° C., preferably 280° C. By stating that it does not expand, it is meant that at least 80% of the graphite does not expand. The extensibility in the present invention means the difference between the specific volume (ml/g) after the heating and that at room temperature (20° C.).

The extensibility can be measured specifically as follows. A quartz beaker is heated previously to 1000° C. in an electric furnace. Two grams of heat-expandable graphite is introduced into this quartz beaker quickly, and the quartz beaker is placed immediately in the electric furnace for 10 seconds to cause extension of the graphite. The weight of 100 ml of the extended graphite is measured to obtain the loosened apparent specific gravity (g/ml). Specific volume]=1/[Loosened apparent specific gravity].

Separately, the specific volume of the unheated heat-expandable graphite is obtained at room temperature similarly. [Expandability]=[Specific volume after heating]−[Specific volume at room temperature].

In one embodiment of the invention, the heat-expandable graphite of the present invention extends by heating only in the c-axis direction, but expands little in the a-axis direction and the b-axis direction according to electron microscopical observation.

The process for producing the heat-expandable graphite which can be used according to the present invention is not specially limited. It can be obtained, for example, by oxidation treatment of natural graphite or artificial graphite. The oxidation is conducted, for example, by treatment with an oxidizing agent such as hydrogen peroxide and nitric acid in sulfuric acid. Otherwise, the heat-expandable graphite can also be produced by reduction treatment of graphite. The reduction is conducted, for example, by treatment with sodium naphthalenide in an aprotic organic solvent.

The particle size of the heat-expandable graphite of the present invention affects the fire retardancy of the resulting polymer composition.

The particle size distribution of the graphite e.g. contains particles passing through a 80 mesh sieve at a content of 20% or lower by weight, more preferably from 1% to 20% by weight.

The heat-expandable graphite (C1) often has a particle size larger than a certain level as mentioned above. In a further embodiment of the invention, the surface of the heat-expandable graphite particles is surface-treated, e.g. with a silane-coupling agent, or a titanate-coupling agent in order to prevent the adverse effects of larger particles on the properties of the polymer composition.

The heat-expandable graphite (C1), which is produced e.g. by oxidation in sulfuric acid process as described above, can be slightly acidic depending on the process conditions. When the graphite is acidic, corrosion of the apparatus for production or processing of the polymer composition can be inhibited by addition of an alkaline substance such as magnesium and aluminum hydroxide to the composition. The alkaline substance is preferably allowed to exist close to the heat-expandable graphite particles for efficient corrosion prevention. For this purpose, the alkaline substance is preferably mixed with the heat-expandable graphite preliminarily to adhere to the surface of the heat-expandable graphite surface. The alkaline substance is added in an amount of less than 10% by weight of the heat-expandable graphite.

The flame-retardant component C also contains a compound (C2). This component (C2) of the present invention particularly is a phosphorus compound which exhibits synergism with the heat-expandable graphite (C1) and preferably inhibits smoking. Suitable phosphorus compounds include arylphosphine-compounds, esters of oxo-acids of phosphorus (hereinafter referred to as "phosphoric acid"), phosphoric acid salts, phosphoric acid ester salts, and condensed phosphoric acid salts.

Among this component (C2), those containing nitrogen produce high fire retardancy, specifically exemplified by nitrogen-containing phosphate salts such as ammonium polyphosphate, melamine-modified ammonium polyphosphate, melamine polyphosphate, and melamine phosphate. Of these, ammonium polyphosphate is very suitable because of its high phosphorus content. In particular, in uses requiring water resistance, the ammonium polyphosphate can be coated on the surface e.g. with a polymer such as a melamine resin, a urea resin, and a phenol resin.

The flame-retardant component C also contains a compound (C3). As a component (C3) according to this invention a synthetic fluoropolymer is used, preferably in a small amount. Various fluoropolymers like e.g. polytetrafluoroethylene (PTFE) are known for many years. PTFE like the commercial product Teflon (DuPont) are extremely resistant polymers having a low coefficient of friction, a high melting point and good physical properties even at high temperatures.

The polymer PTFE and its industrial applications have been broadly described in the literature. Several synthetic fluoropolymers have been described in the literature. The reaction conditions for the polymerization of tetrafluoroethylene are also well known. The component C3 is preferably a polytetrafluoroethylene. The component (C3) according to the invention is used in amounts of 0.01 to 5%, preferably from 0.01 to 1% and in particular from 0.01 to 0.4% by weight of the total thermoplastic composition.

The combined use of the phosphorus compound (C2) with the heat-expandable graphite (C1) in ABS-copolymers is also one aspect of the invention. In the JP Patent Application 6-25476 the use of a combination of a phosphorus compound and heat-expandable graphite is described, however, the teaching is limited to a fire-retarding effect for olefin type polymers. Generally it can be observed that the same fire-retardant additives give different performance in fire retardation depending on the type of polymer. Therefore, normally a fire retardant additive effective for polyethylene cannot be expected to be effective also for ABS polymers.

In the composition of the present invention, the component C1, component C2 and component C3 are used respectively in an amount of example (all with respect to the total thermoplastic composition):
  C1: from 8 to 15% by weight,
  C2: from 4 to 15% by weight,
  C3: from 0.01 to 0.5% by weight.

With less than the respective amounts of the components C, the fire retardancy of the polymer is not sufficient, while with more than the respective amounts, the rate off increase of the fire retardancy becomes lower, and the physical thermoplastic polymer properties come to be impaired.

The invention also provides a thermoplastic molding composition which comprises, as further components (K), one or more components selected from the group of the dispersing agents (DA), buffer substances (BS), molecular weight regulators (MR), fillers (F), and additives (D). The thermoplastic molding composition can comprise, as further components also other flame retardant compounds like e.g. zink borate.

In principle, the thermoplastic moldings can also contain other flame retardant ABS products like e.g. Starex ABS VH-0800 E (Samsung, Cheil Ind.), Kumho ABS HFA 700 (Korea Kumho Petrochem.), Magnum 5200 (Dow), Polylac PA-765A (Chi Mei), Cyclolac KJB (General Electric).

The component P is a copolymer from styrene and butadiene, e.g. as described in WO 2000/36010.

The test methods used for characterization of the polymers are briefly collated below:

Charpy Notched Impact Resistance (ak) [kJ/m$^2$]:
Notched impact resistance is determined at 23° C. or –40° C. to ISO 179-2/1eA (F) on test specimens (80×10×4 mm, produced to ISO 294 in a family mold at a melt temperature of 250° C. and at a mold temperature of 60° C.).

Penetration (Multiaxial Toughness) [Nm]:
Penetration is determined to ISO 6603-2 on plaques (60×60×2 mm, produced to ISO 294 in a family mold at a melt temperature of 240° C. and at a mold temperature of 50° C.).

Flowability (MVR[ml/10']):
Flowability is determined to ISO 1133 B on a polymer melt at 220° C. with a load of 10 kg.

Elasticity (Modulus of Elasticity [MPa]):
Elasticity is tested to ISO 527-2/1N50 on test specimens (produced to ISO 294 at a melt temperature of 250° C. and at a mold temperature of 60° C.).

Amount of Coagulate:
The amount of coagulate, dried for 17 hours at 80° C. under nitrogen (200 mbar) is determined, based on the graft rubber after filtration by way of a sieve whose mesh width is about 1 mm.

Particle Size:
The data for average particle size (d) are the weight-average particle size, which can be determined by means of an analytical ultracentrifuge by the method of W. Mächtle, S. Harding (eds.), Analytische Ultrazentrifuge [Analytical ultracentrifuge] (AUC) in Biochemistry and Polymer Science, Royal Society of Chemistry Cambridge, UK 1992, pp. 1447-1475. The ultracentrifuge measurement provides the cumulative weight distribution of the particle diameter of a specimen. From this, it is possible to deduce the percentage by weight of the particles whose diameter is equal to or smaller than a certain size.

Particle size can also be determined by hydrodynamic fractionation (HDF). HDF measurement uses flow of a liquid carrier material through a column packed with a polymeric carrier material. Whereas small particles which can penetrate even relatively small interstices pass through the column at a low rate of flow, particles with relatively large diameter are trans-ported more rapidly. Particles size is determined by means of a UV detector (at wave length 254 nm) at the end of the column. The specimens to be tested are preferably diluted to a concentration of 0.5 g/l of the liquid carrier material, and then subjected to a filtration process, and then charged to the column. Commercially available HDF equipment is supplied by Polymer Laboratories, for example. The HDF values stated are based on volume distribution.

The weight-average particle size diameter $d_{50}$ is that particle diameter which is smaller than that of 50% by weight of all of the particles and larger than that of 50% by weight of all of the particles.

Swelling Index and Gel Content [%]:
A film was produced from the aqueous dispersion of the graft base via evaporation of the water, and 50 g of toluene was admixed with 0.2 g of this film. After 24 hours, the toluene was removed by suction from the swollen specimen, and the final weight of the specimen was measured. After 16 hours of drying of the specimen in vacuo at 110° C., the final weight of the specimen was again determined. The following were calculated:

$$\text{swelling index } SI = \frac{\text{weight of swollen specimen after removal of solvent by suction}}{\text{Weight of specimen dried in vacuo}}$$

$$\text{gel content} = \frac{\text{weight of specimen dried in vacuo}}{\text{initial weight of specimen prior to swelling}} \cdot 100\%$$

Viscosity
Viscosity number ($V_Z$) is determined to DIN 53726 on a 0.5% strength solution of the polymer in DMF.

Gloss (Gloss Sensitivity)
To determine gloss, an injection-molding machine was used to produce rectangular plaques of dimensions 40 mm×60 mm×2 mm from the polymer melt. Temperatures used here were 230, 255, and 280° C. The mold temperature was 30° C., and the injection times were from 0.1 to 0.5 seconds. Gloss is determined via measurement of reflection to the standard ISO 2813 at an angle of 45°, in each case on ten test plaques, using equipment from BYK Mikroglas.

Extent of Crosslinking

A method of characterizing the extent of crosslinking of polymers is measurement of NMR relaxation times of the labile protons, these being known as $T_2$ times.

The greater the extent of crosslinking of a particular polymer, the lower its $T_2$ times. Usual $T_2$ times for the inventive graft bases are $T_2$ times in the range from 1 to 50 ms, preferably from 2.5 to 40 ms, and particularly preferably from 2.5 to 30 ms, in each case measured on filmed specimens at 80° C. The $T_2$ time is measured via measurement of NMR relaxation of a dewatered and filmed specimen of the graft base dispersion. For this, by way of example, the specimen is dried overnight in vacuo after drying in air and is then tested with suitable test equipment. Comparison can only be made between specimens which have been tested by the same method, since relaxation is highly temperature-dependent. The effective transverse relaxation time of the materials is in the range from 1 to 50 ms when measured at proton resonance frequency of 20 MHz and a temperature of 140° C. A magnetization decay curve is utilized to determine the relaxation times and is composed of a solid echo and from a plurality of spin-echo measurements. The effective relaxation time is defined as the time after which the magnetization decay curve has decayed to a factor of 1/e in comparison with the initial amplitude determined by means of the solid echo.

The following examples further illustrate the invention:

The following components were used for the preparation of thermoplastic molding compositions:

| Name | Material type | Trade name | Company | Country |
|---|---|---|---|---|
| ABS | Acrylonitrile-Styrene-Butadiene copolymer | Terluran ® | BASF | Belgium |
| SAN | Styrene-Acrylonitrile copolymer (34 wt % AN, viscosity number 79 ml/g) | | | |
| TTP | Triphenyl phosphate | Disflamoll ® TP | Lanxess | Germany |
| HEG | Heat Expandable Graphite | Nord-Min ® 503 | Nordmann, Rassmann GmbH | Germany |
| Teflon ® | Teflon dispersion | PTFE TE-3893 | C.H. Erbslöh | Germany |
| ASA | Acrylonitrile-Styrene-butylacrylate copolymer | Luran ® S | BASF | Germany |
| BAPP | Bisphenol A bi-phosphate | Reofos ® BAPP | Chemtura | USA |
| ZB | Zinc borate | Firebrake ® ZB | Nordmann, Rassmann GmbH | Germany |
| Melapur 200 | Melamine poly-phosphate | Melapur ® 200 | Ciba | Germany |
| Styroflex | Styrene-butadiene-styrene block co-polymer | Styroflex ® | BASF | Germany |

Sample Preparation for Thermoplastic Moulding:

Samples for the burning test were extruded and injection moulded using a DSM twin-screw Midi extruder with injection moulding device. Dimensions of the test bars were according to the UL94 vertical burning standard (thickness 1.6 mm).

Samples for mechanical testing were extruded using a ZSK30 twin screw extruder (220° C.). Afterwards test bars were injection moulded and tested (injection moulding temperature 250° C./mold temperature 30° C.).

Average Burning Time of the Thermoplastic Compositions:

Two samples with a thickness of 1.6 mm were burned according to the UL94 vertical burning test standard. The total burning time of both samples was averaged.

Surface Treatment of the Component HEG:

A further aspect of the invention is to modify the HEG surface to make it compatible with the thermoplastic polymer matrix and/or compatible with the rubber phase. Modification with SAN type polymers can help to improve the adhesion with the SAN matrix of ABS, which will help to improve impact properties. Also modification with phosphorous flame retardant compounds can help to improve affinity with the matrix or with the rubber phase and additionally can improve the flame retardancy of the material.

The following test results were obtained:

Example 1

In Table 1 it is shown that a favourable amount of Heat Expandable Graphite (HEG; component C1) is 15 wt % (see Test B2). With this amount of HEG the lowest burning time (in seconds) was observed.

TABLE 1

| | | B1 | B2 | B3 | B4 |
|---|---|---|---|---|---|
| ABS | [%] | 22.6 | 22.6 | 22.6 | 22.6 |
| SAN | [%] | 47 | 50 | 53 | 55 |
| TTP | [%] | 12 | 12 | 12 | 12 |
| HEG | [%] | 18 | 15 | 12 | 10 |
| Teflon | [%] | 0.4 | 0.4 | 0.4 | 0.4 |
| Average burning time | [sec] | 4.75 | 3.2 | 8.45 | 27.95 |

Example 2

Table 2 shows the influence of varying amounts of triphenyl phosphate (TPP; component C2) on the burning behavior of the thermoplastic material. The lowest burning time was obtained using 12 wt % of TPP (see Test B2).

TABLE 2

| | | B6 | B2 | B7 | B8 | B9 |
|---|---|---|---|---|---|---|
| ABS | [%] | 22.6 | 22.6 | 22.6 | 22.6 | 22.6 |
| SAN | [%] | 48 | 50 | 52 | 54 | 56 |
| TTP | [%] | 14 | 12 | 10 | 8 | 6 |
| HEG | [%] | 15 | 15 | 15 | 15 | 15 |
| Teflon | [%] | 0.4 | 0.4 | 0.4 | 0.4 | 0.4 |
| Average burning time | [sec] | 5.3 | 3.2 | 5.3 | 18.9 | 17.25 |

Example 3

Table 3 shows the influence of small amounts of a perfluorinated polymer (Teflon; component C3).

Without Teflon the sample burns much longer. Also the sample drips during burning.

TABLE 3

|  |  | B10 | B2 |
|---|---|---|---|
| ABS | [%] | 22.6 | 22.6 |
| SAN | [%] | 50 | 50 |
| TTP | [%] | 12 | 12 |
| HEG | [%] | 15 | 15 |
| Teflon | [%] | 0 | 0.4 |
| Average burning time | [sec] | 20.3 | 3.2 |

The advantages by adding Teflon as flame retardant component are in particular:
- it prevents dripping of sample during burning,
- it reduces burning time,
- even adding small amounts of Teflon to a thermoplastic polymer formulation (e.g. with 70% ABS, 15% HEG and 12% TPP) improves notched impact and E-module.

Particularly good results were obtained when adding 0.4 wt % Teflon to the thermoplastic composition (notched impact increases 50%, E-module increases 3%).

Example 4

Also with other flame retardants in combination with HEG and Teflon a flame retardant ABS that burns less than 10 seconds in the UL94 vertical burning test can be obtained (see Table 4). These other flame retardants are described above.

TABLE 4

|  |  | B10 | B11 | B12 | B13 |
|---|---|---|---|---|---|
| ABS | [%] | 22.6 | 22.6 | 22.6 | 22.6 |
| SAN | [%] | 56 | 56 | 56 | 50 |
| HEG | [%] | 15 | 15 | 15 | 15 |
| Teflon | [%] | 0.4 | 0.4 | 0.4 | 0.4 |
| BAPP | [%] | 6 |  |  |  |
| Melapur 200 | [%] |  | 6 | 3 |  |
| TPP | [%] |  |  | 3 | 6 |
| Firebrake ZB | [%] |  |  |  | 6 |
| Average burning time | [sec] | 1.8 | 2.0 | 4.6 | 6.3 |

Example 5

Additional Experiments with Different Polymers

The flame retardant mixture works very well with ABS polymers but also can be used with ASA copolymers (as described in EP-A 045 485) as well (see Table 5).

TABLE 5

|  |  | B14 |
|---|---|---|
| ASA | [%] | 50 |
| SAN | [%] | 22.6 |
| TTP | [%] | 12 |
| HEG | [%] | 15 |
| Teflon | [%] | 0.4 |
| Average burning time | [sec] | 3.4 |

Examples 6 and 7

Improved Mechanics of the Thermoplastic Compositions

The replacement of a part of Terluran by the styrene-butadien copolymer Styroflex® (BASF) improves the mechanics of the thermoplastic compositions like flow, puncture impact, notched impact and unnotched impact (see Table 6). With Styroflex® the average burning time goes up, but still a UL94 V-1 rating (burning time <30 sec) can be obtained (see Table 7).

TABLE 6

|  |  | M1 | M2 |
|---|---|---|---|
| Terluran ® | [%] | 72.6 | 57.6 |
| Styroflex ® | [%] | — | 15 |
| Disflamoll ® TP | [%] | 12 | 12 |
| Blahgrafit Nord-Min ® 503, NRC | [%] | 15 | 15 |
| Teflondispersion | [%] | 0.4 | 0.4 |
| MVR, 200° C./10 kg | [cm$^3$/10 min] | 12.5 | 26.8 |
| Penetration, ISO 6603-2/40/20c | [J] | 2.8 | 4.4 |
| Notched Impact (23° C.) | [kJ/m$^2$] | 5.7 | 14.4 |
| Unnotched Impact (23° C.) | [kJ/m$^2$] | 15.6 | 33 |

TABLE 7

|  |  | B15 | B16 |
|---|---|---|---|
| Terluran ® | [%] | 72.6 | 57.6 |
| Styroflex ® | [%] | — | 15 |
| Disflamoll TP | [%] | 12 | 12 |
| Blahgrafti Nord-Min 503, NRC | [%] | 15 | 15 |
| Teflondispersion | [%] | 0.4 | 0.4 |
| Average burning time | [sec] | 9.9 | 14.7 |

Example 8

Comparative Tests

Table 8 shows that all flame retardant components C1, C2 and C3 separately do not result in a sufficiently effective flame retardant material. All these thermoplastic samples burned completely.

TABLE 8

|  |  | B17 | B18 | B19 | B20 | B21 |
|---|---|---|---|---|---|---|
| ABS | [%] | 22.6 | 22.6 | 22.6 | 22.6 | 22.6 |
| SAN | [%] | 56 | 62.4 | 65.4 | 77 | 67.4 |
| HEG | [%] |  | 15 |  |  |  |
| Teflon ® | [%] |  |  | 12 |  |  |
| TPP | [%] |  |  |  | 0.4 |  |
| Styroflex ® | [%] |  |  |  |  | 10 |
| Average burning time | [sec] | >30 | >30 | >30 | >30 | >30 |

The invention claimed is:
1. A flame retardant thermoplastic molding composition, comprising a thermoplastic copolymer A, a graft copolymer B, and a flame retardant component C and optionally further components P and K, where the molding composition comprises:
   A: from 40 to 80% by weight of a thermoplastic copolymer A, obtainable from acrylonitrile and of styrene or α-methylstyrene or of a mixture composed of styrene and α-methylstyrene;
   B: from 15 to 50% by weight of a graft copolymer B, which can be prepared from a graft base (B1), obtainable via the reaction of styrene and/or butadiene and/or $C_2$-$C_{10}$ alkylacrylate, and eventually other copolymerizable components; and a graft shell (B2), obtainable via reaction of the graft base (B1) with a mixture of styrene and/or α-methylstyrene and acrylonitrile;

C: from 15 to 32% by weight of the flame retardant component C, comprising at least three components:
(C1) an expandable graphite component (C1) wherein at least 80% of (C1) does not expand on heating before achieving a temperature of 270° C., and
(C2) a phosphorous flame retardant component (C2), and
(C3) a perfluorinated polymer (C3);
P: from 0 to 15% by weight of a styrene butadiene-copolymer P,
K: from 0 to 5% by weight of further components K,
and wherein K is one or more components selected from the group consisting of the dispersing agents (DA), buffer substances (BS), molecular weight regulators (MR), fillers (F), additives (D) and flame retardant compounds,
wherein the entire composed thermoplastic molding composition gives exactly 100% by weight.

2. The flame retardant thermoplastic molding composition according to claim 1, wherein the molding composition comprises:
A: from 40 to 80% by weight of a thermoplastic copolymer A obtainable from:
(A1): from 18 to 36% by weight, based on the copolymer A, of acrylonitrile, and
(A2): from 64 to 82% by weight, based on the copolymer A, of styrene or α-methylstyrene or of a mixture composed of styrene and α-methylstyrene;
B: from 15 to 50% by weight of a graft copolymer B, which can be prepared from:
(B1) from 50 to 70% by weight, based on the graft copolymer B, of a graft base (B1), obtainable via the reaction of:
(B11): from 0 to 10% by weight, based on the graft base (B1), of styrene,
(B12): from 90 to 100% by weight, based on the graft base (B1), of butadiene, and
(B13): from 0.01 to 5% by weight, based on the graft base (B1), of other components, where the total (B11)+(B12)+(B13) gives exactly 100% by weight; and
(B2): from 30 to 50% by weight, based on the graft copolymer B, of a graft shell obtainable via reaction of the graft base (B1) with a mixture of:
(B21) from 72 to 82% by weight, based on the graft shell (B2), of styrene, and
(B22) from 18 to 28% by weight, based on the graft shell (B2), of acrylonitrile,
wherein the entirety composed of graft base (B1) and graft shell (B2) gives exactly 100% by weight of the graft polymer B;
C: from 15 to 32% by weight of the flame retardant component C, comprising:
(C1) an expandable graphite component (C1), wherein at least 80% by weight of (C1) does not expand at temperatures under 270° C. and
(C2) a phosphorous flame retardant component (C2), and
(C3) a perfluorinated polymer (C3);
P: from 0 to 15% by weight of a styrene-butadiene-block-copolymer P,
K: from 0 to 5% by weight of further components K,
wherein the entire composed thermoplastic molding composition gives exactly 100% by weight.

3. The flame retardant thermoplastic molding composition according to claim 1, comprising 40 to 60% by weight of a thermoplastic copolymer A, 15 to 30% by weight of a graft copolymer B which is an ABS-copolymer or an ASA-copolymer, and 15 to 32% by weight of a flame retardant component C, where the flame retardant component C comprises:
(C1): from 20 to 80% by weight, based on the flame retardant component C, of an expandable graphite (C1) with an expansion-temperature of higher than 270° C.,
(C2): from 20 to 80% by weight, based on the flame retardant component C, of a phosphorous flame retardant component (C2), and
(C3): from 0.1 to 2% by weight, based on the flame retardant component C, of a perfluorinated polyolefine (C3).

4. The flame retardant thermoplastic molding composition according to claim 1, wherein the phosphorous flame retardant component (C2) is one or more compounds selected from tri-arylphosphines, a phosphate, a phosphite or a phosphorus compound containing nitrogen, esters of oxo-acid of phosphorus (hereinafter referred to as "phosphoric acid"), salts of phosphoric acid, salts of phosphoric acid esters, and salts of condensed phosphoric acids.

5. The flame retardant thermoplastic molding composition according to claim 1, wherein the phosphorous flame retardant component (C2) is a tri-arylphosphine, a triaryl phosphate or ammonium polyphosphate.

6. The flame retardant thermoplastic molding composition according to claim 1, wherein the phosphorous flame retardant component (C2) is triphenyl phosphate or ammonium polyphosphate.

7. The flame retardant thermoplastic molding composition according to claim 1, wherein at least 80% by weight of (C1) do expand only at temperatures of 280° C. or higher.

8. The flame retardant thermoplastic molding composition according to claim 1, wherein the expandable graphite component (C1) has a particle size distribution in which not more than 20% by weight of the particles pass through a 80 mesh sieve.

9. The flame retardant thermoplastic molding composition according to claim 1, wherein the perfluorinated polyolefine component (C3) is a polytetrafluorethylene polymer.

10. The flame retardant thermoplastic molding composition according to claim 1, wherein the flame retardant component C comprises:
(C1): from 8 to 15% by weight, based on the thermoplastic molding composition, of the expandable graphite (C1);
(C2): from 4 to 15% by weight, based on the thermoplastic molding composition, of the phosphorous flame retardant component (C2); and
(C3): from 0.01 to 0.4% by weight, based on the thermoplastic molding composition, of a perfluorinated polyolefine (C3).

11. The flame retardant thermoplastic molding composition according to claim 1, comprising from 50 to 80% by weight of a thermoplastic copolymer A, obtainable by emulsion or bulk polymerization from acrylonitrile and styrene.

12. The flame retardant thermoplastic molding composition according to claim 1, comprising from 15 to 30% by weight of a graft copolymer B, obtainable either via emulsion polymerization from styrene, butadiene and acrylonitrile or obtainable via anionic polymerization from butylacrylate, styrene and acrylonitrile.

13. A process for the preparation of a flame retardant thermoplastic molding composition, comprising the step of mixing of a thermoplastic copolymer A and of a graft copolymer B with a flame retardant component C and optionally further components P and K, wherein the molding composition comprises:

A: from 40 to 80% by weight of a thermoplastic copolymer A, obtainable from acrylonitrile and of styrene or α-methylstyrene or of a mixture composed of styrene and α-methylstyrene;

B: from 15 to 50% by weight of a graft copolymer B, which can be prepared from a graft base (B1), obtainable via the reaction of styrene, butadiene and/or butylacrylate and eventually other copolymerizable components; and a graft shell (B2), obtainable via reaction of the graft base (B1) with a mixture of styrene and/or α-methylstyrene and acrylonitrile;

C: from 15 to 30% by weight of the flame retardant component C, comprising at least three components:
  (C1) an expandable graphite component (C1) wherein at least 80% of C1 does not expand on heating before achieving a temperature of 270° C., and
  (C2) a phosphorous flame retardant component (C2), and
  (C3) a perfluorinated polymer (C3);

P: from 0 to 15% by weight of a styrene-butadiene-block-copolymer P,

K: from 0 to 5% by weight of further components K,
  and wherein K is one or more components selected from the group consisting of dispersing agents (DA), buffer substances (BS), molecular weight regulators (MR), fillers (F), additives (D) and flame retardant compounds, and wherein the entire composed thermoplastic molding composition gives exactly 100% by weight.

14. A method of preparation of flame retardant moldings which comprises utilizing the flame retardant thermoplastic molding composition according to claim 1.

15. A molding prepared from the flame retardant thermoplastic molding composition according to claim 1.

16. The flame retardant thermoplastic molding composition according to claim 1, wherein K is one or more components selected from the group consisting of dispersing agents (DA), buffer substances (BS), molecular weight regulators (MR), fillers (F), additives (D) and zinc borate.

17. The process as claimed in claim 13, wherein K is one or more components selected from the group consisting of dispersing agents (DA), buffer substances (BS), molecular weight regulators (MR), fillers (F), additives (D) and zinc borate.

18. The flame retardant thermoplastic molding composition according to claim 1, wherein K is zinc borate.

19. The process as claimed in claim 13, wherein K is zinc borate.

* * * * *